(12) United States Patent
Castinado et al.

(10) Patent No.: US 12,413,543 B2
(45) Date of Patent: Sep. 9, 2025

(54) SYSTEMS AND METHODS FOR DYNAMICALLY GENERATING OUTPUT DATA IN RESPONSE TO INPUT COMMUNICATIONS USING ARTIFICIAL INTELLIGENCE

(71) Applicant: BANK OF AMERICA CORPORATION, Charlotte, NC (US)

(72) Inventors: Joseph Benjamin Castinado, North Glenn, CO (US); Hope Barus, Indian Land, SC (US); Shailesh Lolam, Glendale, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 52 days.

(21) Appl. No.: 18/428,458

(22) Filed: Jan. 31, 2024

(65) Prior Publication Data

US 2025/0247350 A1 Jul. 31, 2025

(51) Int. Cl.
| | | |
|---|---|---|
| *G06F 15/16* | (2006.01) | |
| *G06F 40/263* | (2020.01) | |
| *G06F 40/40* | (2020.01) | |
| *H04L 51/21* | (2022.01) | |
| *H04L 67/1396* | (2022.01) | |

(52) U.S. Cl.
CPC .......... *H04L 51/21* (2022.05); *G06F 40/263* (2020.01); *G06F 40/40* (2020.01); *H04L 67/1396* (2022.05)

(58) Field of Classification Search
CPC ... H04L 51/21; H04L 67/1396; G06F 40/263; G06F 40/40
See application file for complete search history.

(56) References Cited

U.S. PATENT DOCUMENTS

| | | | |
|---|---|---|---|
| 10,635,506 B1* | 4/2020 | Dintenfass | G06F 16/9537 |
| 2014/0244712 A1* | 8/2014 | Walters | H04L 67/10 709/202 |
| 2016/0196490 A1* | 7/2016 | Chandrasekaran | G06F 40/40 706/50 |
| 2016/0196491 A1* | 7/2016 | Chandrasekaran | G06F 16/26 706/50 |
| 2021/0027898 A1* | 1/2021 | Sun | G16H 10/60 |
| 2022/0092215 A1* | 3/2022 | Ciobotaru | H04L 63/0421 |

* cited by examiner

*Primary Examiner* — Razu A Miah
(74) *Attorney, Agent, or Firm* — Moore & Van Allen PLLC; R.W. McCord Rayburn (57) ABSTRACT

Systems, computer program products, and methods are described herein for dynamically generating output data in response to input communications using artificial intelligence. Some embodiments are directed to a system that receives a first user communication input by the user to a user device, identifies, within labeled user interaction data and in response to receiving the first user communication, user-specific labeled user interaction data collected during interactions with the user, and trains a large language model using the user-specific labeled user interaction data. The system may transmit, in response to receiving the first user communication, first instructions to the user device to cause the user device to display a first responsive communication to the user.

18 Claims, 5 Drawing Sheets

SYSTEMS AND METHODS FOR DYNAMICALLY GENERATING OUTPUT DATA IN RESPONSE TO INPUT COMMUNICATIONS USING ARTIFICIAL INTELLIGENCE

TECHNOLOGICAL FIELD

Example embodiments of the present disclosure relate to systems and methods for dynamically generating output data in response to input communications using artificial intelligence.

BACKGROUND

A user may contact an entity in an effort to obtain resource management services from the entity on behalf of another entity associated with the user. The entity may manage one or more systems configured to request information from users to determine whether or not the users and/or their associated entities are eligible for the resource management services from the entity, establish resource accounts for the users and/or their associated entities, provide services to the users and/or their associated entities, and/or the like.

BRIEF SUMMARY

Systems, methods, and computer program products are provided for dynamically generating output data in response to input communications using artificial intelligence.

In one aspect, the present invention is directed to a system for dynamically generating output data in response to input communications using artificial intelligence. The system may include a network interface configured to communicate via a communication network and an artificial intelligence engine including a large language model, where the artificial intelligence engine is configured to determine whether user communications are indicative of user misunderstandings. The system may include a non-transitory storage device including computer program code stored thereon and a processing device operably coupled to the network interface, and the non-transitory storage device. The computer program code may include computer instructions configured to cause the processing device to receive, using the network interface and during an interaction with a user, a first user communication input by the user to a user device. The computer program code may include computer instructions configured to cause the processing device to identify, within labeled user interaction data and in response to receiving the first user communication, user-specific labeled user interaction data collected during interactions with the user, where the labeled user interaction data is based on user interaction data collected during a plurality of interactions between users and an entity. The computer program code may include computer instructions configured to cause the processing device to train the large language model using the user-specific labeled user interaction data and transmit, using the network interface, during the interaction, and in response to receiving the first user communication, first instructions to the user device to cause the user device to display a first responsive communication to the user. The computer program code may include computer instructions configured to cause the processing device to receive, using the network interface and during the interaction, a second user communication input by the user to the user device and analyze, using the artificial intelligence engine and during the interaction, the second user communication to determine whether the user misunderstood the first responsive communication. The computer program code may include computer instructions configured to cause the processing device to determine, using the artificial intelligence engine, in response to determining that the user misunderstood the first responsive communication, and during the interaction, an alternative responsive communication that corresponds to the first responsive communication. The computer program code may include computer instructions configured to cause the processing device to transmit, using the network interface and during the interaction, alternative instructions to the user device to cause the user device to display the alternative responsive communication to the user.

In some embodiments, the computer program code may include computer instructions configured to cause the processing device to, before transmitting the first responsive communication, determine, using the artificial intelligence engine and based on the first user communication, the first responsive communication.

In some embodiments, the computer program code may include computer instructions configured to cause the processing device to receive, using the network interface, the user interaction data collected during the plurality of interactions between the users and the entity. Additionally, or alternatively, the computer program code may include computer instructions configured to cause the processing device to label, for each interaction of the plurality of interactions, the user interaction data of the respective interaction as either (i) an interaction in which one or more users misunderstood a communication or (ii) an interaction in which all users understood all communications to obtain the labeled user interaction data. In some embodiments, the computer program code may include computer instructions configured to cause the processing device to train the large language model using the labeled user interaction data.

In some embodiments, the computer program code may include computer instructions configured to cause the processing device to determine, in response to receiving the first user communication, a geographic region associated with the user. Additionally, or alternatively, the computer program code may include computer instructions configured to cause the processing device to, when determining the alternative responsive communication, determine the alternative responsive communication based on the geographic region associated with the user.

In some embodiments, the first responsive communication may be and/or include a language-based communication, and the alternative responsive communication may include a video displayed by the user device to the user.

In some embodiments, the first responsive communication may be and/or include a language-based communication, and the alternative responsive communication may include an image displayed by the user device to the user.

In some embodiments, the first responsive communication may be and/or include a text-based communication, and transmitting the alternative instructions to the user device may cause the user device to audibly communicate the alternative responsive communication.

In some embodiments, the first responsive communication may be in a first language, and the alternative responsive communication may be in a second language that is different from the first language.

In some embodiments, the computer program code may include computer instructions configured to cause the processing device to, when analyzing the second user communication to determine whether the user misunderstood the first responsive communication, analyze the user's inputting of the second user communication into the user device to identify pauses taken, typing speed, and facial expressions of the user.

In another aspect, the present invention is directed to a computer program product for dynamically generating output data in response to input communications using artificial intelligence. The computer program product may include a non-transitory computer-readable medium including code causing an apparatus to receive, using a network interface and during an interaction with a user, a first user communication input by the user to a user device. The non-transitory computer-readable medium may include code causing an apparatus to identify, within labeled user interaction data and in response to receiving the first user communication, user-specific labeled user interaction data collected during interactions with the user, where the labeled user interaction data is based on user interaction data collected during a plurality of interactions between users and an entity. The non-transitory computer-readable medium may include code causing an apparatus to train a large language model of an artificial intelligence engine using the user-specific labeled user interaction data, where the artificial intelligence engine is configured to determine whether user communications are indicative of user misunderstandings. The non-transitory computer-readable medium may include code causing an apparatus to transmit, using the network interface, during the interaction, and in response to receiving the first user communication, first instructions to the user device to cause the user device to display a first responsive communication to the user. The non-transitory computer-readable medium may include code causing an apparatus to receive, using the network interface and during the interaction, a second user communication input by the user to the user device. The non-transitory computer-readable medium may include code causing an apparatus to analyze, using the artificial intelligence engine and during the interaction, the second user communication to determine whether the user misunderstood the first responsive communication. The non-transitory computer-readable medium may include code causing an apparatus to determine, using the artificial intelligence engine, in response to determining that the user misunderstood the first responsive communication, and during the interaction, an alternative responsive communication that corresponds to the first responsive communication. The non-transitory computer-readable medium may include code causing an apparatus to transmit, using the network interface and during the interaction, alternative instructions to the user device to cause the user device to display the alternative responsive communication to the user.

In some embodiments, the non-transitory computer-readable medium may include code causing an apparatus to, before transmitting the first responsive communication, determine, using the artificial intelligence engine and based on the first user communication, the first responsive communication.

In some embodiments, the non-transitory computer-readable medium may include code causing an apparatus to receive, using the network interface, the user interaction data collected during the plurality of interactions between the users and the entity. Additionally, or alternatively, the non-transitory computer-readable medium may include code causing an apparatus to label, for each interaction of the plurality of interactions, the user interaction data of the respective interaction as either (i) an interaction in which one or more users misunderstood a communication or (ii) an interaction in which all users understood all communications to obtain the labeled user interaction data. In some embodiments, the non-transitory computer-readable medium may include code causing an apparatus to train the large language model using the labeled user interaction data.

In some embodiments, the non-transitory computer-readable medium may include code causing an apparatus to determine, in response to receiving the first user communication, a geographic region associated with the user and, when determining the alternative responsive communication, determine the alternative responsive communication based on the geographic region associated with the user.

In some embodiments, the first responsive communication may be and/or include a language-based communication, and the alternative responsive communication may include a video displayed by the user device to the user.

In some embodiments, the first responsive communication may be and/or include a language-based communication, and the alternative responsive communication may include an image displayed by the user device to the user.

In some embodiments, the first responsive communication may be and/or include a text-based communication, and transmitting the alternative instructions to the user device may cause the user device to audibly communicate the alternative responsive communication.

In some embodiments, the first responsive communication may be in a first language, and the alternative responsive communication may be in a second language that is different from the first language.

In some embodiments, the non-transitory computer-readable medium may include code causing an apparatus to, when analyzing the second user communication to determine whether the user misunderstood the first responsive communication, analyze the user's inputting of the second user communication into the user device to identify pauses taken, typing speed, and facial expressions of the user.

In another aspect, the present invention is directed to a method for dynamically generating output data in response to input communications using artificial intelligence. The method may include receiving, using a network interface and during an interaction with a user, a first user communication input by the user to a user device. The method may include identifying, within labeled user interaction data and in response to receiving the first user communication, user-specific labeled user interaction data collected during interactions with the user, where the labeled user interaction data is based on user interaction data collected during a plurality of interactions between users and an entity. The method may include training a large language model of an artificial intelligence engine using the user-specific labeled user interaction data, where the artificial intelligence engine is configured to determine whether user communications are indicative of user misunderstandings. The method may include transmitting, using the network interface, during the interaction, and in response to receiving the first user communication, first instructions to the user device to cause the user device to display a first responsive communication to the user. The method may include receiving, using the network interface and during the interaction, a second user communication input by the user to the user device. The method may include analyzing, using the artificial intelligence engine and during the interaction, the second user communication to determine whether the user misunderstood the first responsive communication. The method may include determining, using the artificial intelligence engine, in response to determining that the user misunderstood the first responsive communication, and during the interaction, an alternative responsive communication that corresponds to the first responsive communication. The method may include transmitting, using the network interface and during the interaction, alternative instructions to the user device to cause the user device to display the alternative responsive communication to the user.

In some embodiments, the method may include, before transmitting the first responsive communication, determining, using the artificial intelligence engine and based on the first user communication, the first responsive communication.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components or blocks than those shown in the figures.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority, or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity. Additionally, or alternatively, the user may be an individual associated with another entity, a customer of the entity, and/or the like.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored, and retrieved electronically using a computing device.

As used herein, a "resource transfer," "resource distribution," or "resource allocation" may refer to any transaction, activities, or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer," a "transaction," a "transaction event," or a "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

Figure 1A:
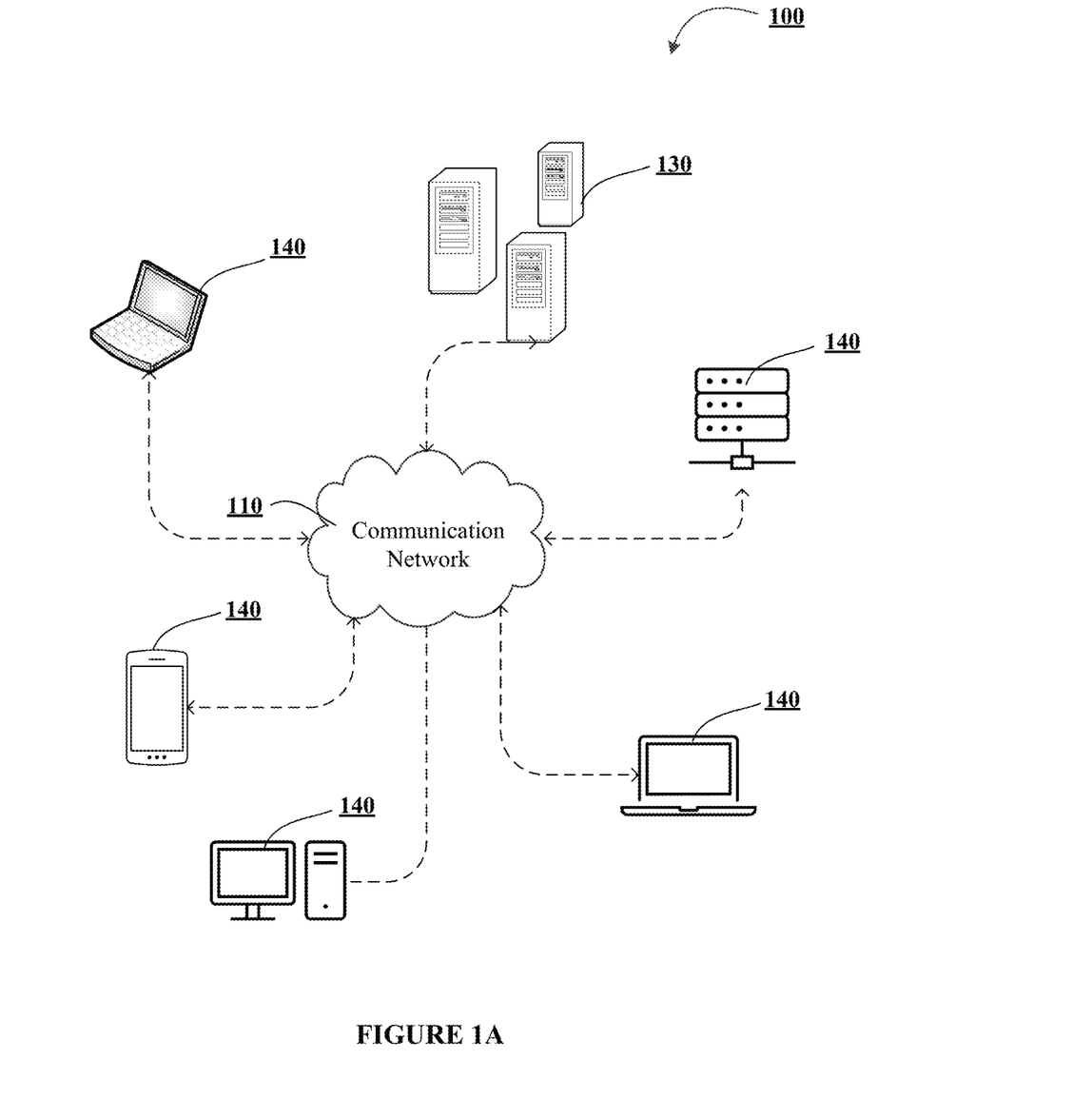
FIGS. 1A-1C illustrate technical components of an exemplary distributed computing environment for dynamically generating output data in response to input communications using artificial intelligence, in accordance with an embodiment of the disclosure.

FIGS. 1A-1D illustrate technical components of an exemplary distributed computing environment 100 for dynamically generating output data in response to input communications using artificial intelligence, in accordance with an embodiment of the disclosure. As shown in FIG. 1A, the distributed computing environment 100 contemplated herein may include a system 130, an end-point device(s) 140, and a communication network 110 over which the system 130 and end-point device(s) 140 communicate therebetween. FIG. 1A illustrates only one example of an embodiment of the distributed computing environment 100, and in some embodiments one or more of the systems, devices, and/or servers may be combined into a single system, device, and/or server, and/or be made up of multiple systems, devices, and/or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., the system 130). In some other embodiments, the system 130 and the end-point device(s) 140 may have a peer-to-peer relationship in which the system 130 and the end-point device(s) 140 are considered equal and all have the same abilities to use the resources available on the communication network 110. Instead of having a central server (e.g., system 130) which would act as the shared drive, each device that is connected to the communication network 110 would act as the server for the files stored on it.

The system 130 may represent various forms of servers, such as web servers, database servers, file servers, and/or the like, various forms of digital computing devices, such as laptops, desktops, video recorders, audio/video players, radios, workstations, and/or the like, and/or any other auxiliary network devices, such as wearable devices, Internet-of-things devices, electronic kiosk devices, entertainment consoles, mainframes, and/or the like, and/or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The communication network 110 may be a distributed network that is spread over different networks. This provides a single data communication network, which can be managed jointly or separately by each network. Besides shared communication within the network, the distributed network often also supports distributed processing. The communication network 110 may be a form of digital communication network such as a telecommunication network, a local area network ("LAN"), a wide area network ("WAN"), a global area network ("GAN"), the Internet, and/or the like. The communication network 110 may be secure and/or unsecure and may also include wireless and/or wired and/or optical interconnection technology.

The structure of the distributed computing environment and its components, connections and relationships, and their functions, are exemplary, and are not meant to limit implementations of the disclosures described and/or claimed herein. For example, the distributed computing environment 100 may include more, fewer, and/or different components. In another example, some or all of the portions of the distributed computing environment 100 may be combined into a single portion or all of the portions of the system 130 may be separated into two or more distinct portions.

Figure 1B:
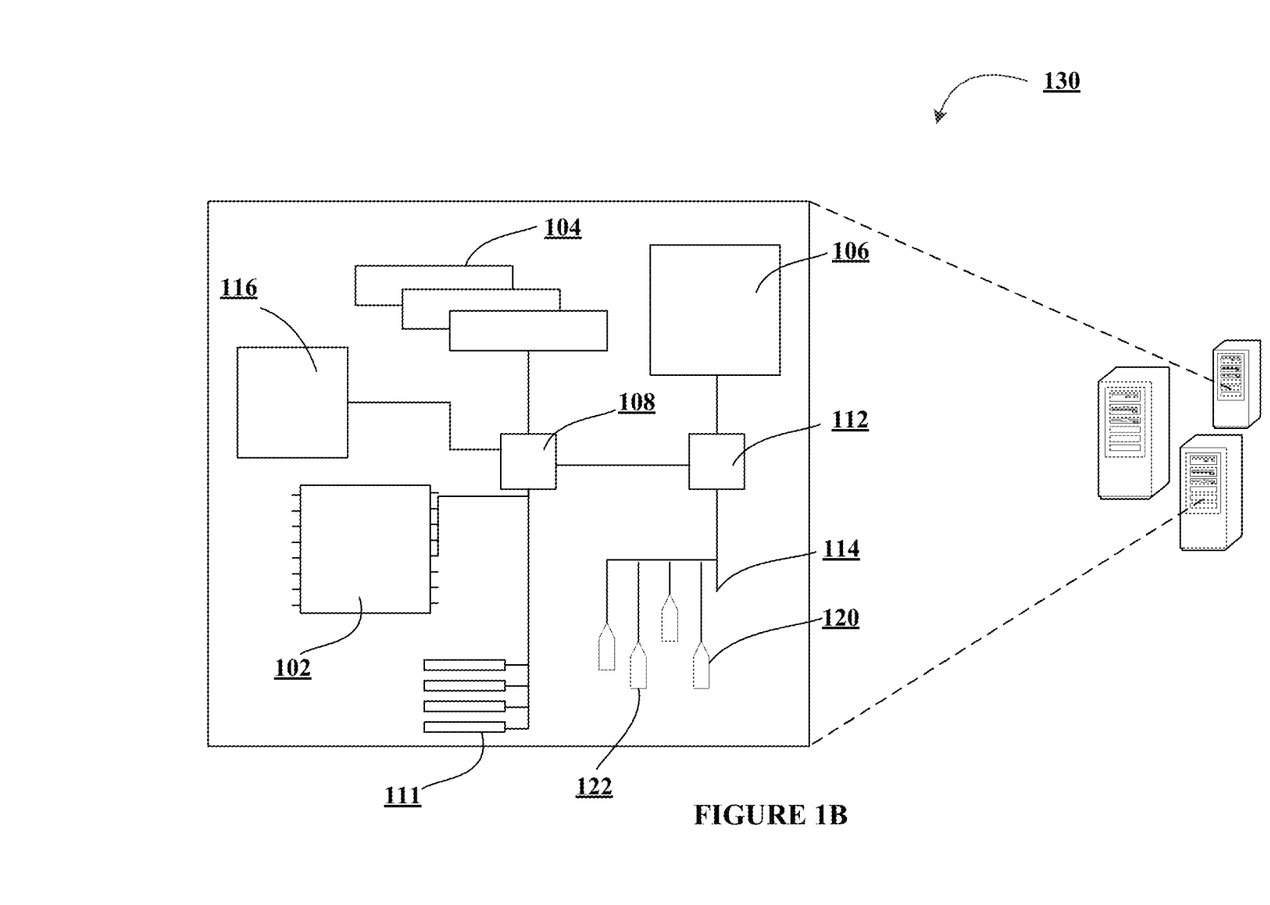

FIG. 1B illustrates an exemplary component-level structure of the system 130, in accordance with an embodiment of the disclosure. As shown in FIG. 1B, the system 130 may include a processor 102 (e.g., a processing device), memory 104, a storage device 106, and an input/output (I/O) device 116. The system 130 may also include a high-speed interface 108 connecting to the memory 104, and a low-speed interface 112 connecting to low-speed bus 114 and storage device 106. Each of the components 102, 104, 106, 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) and/or on the storage device 106, for execution within the system 130 using any subsystems described herein. For example, the processor 102 may execute computer program code stored on a non-transitory storage device (e.g., the memory 104), which may cause the processor 102 to perform one or more of the process flows described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may include a computer-readable medium, such as a floppy disk device, a hard disk device, an optical disk device, a tape device, a flash memory, or other similar solid state memory device, and/or an array of devices, including devices in a storage area network or other configurations. A computer program product can be tangibly embodied in an information carrier. The computer program product may also contain instructions that, when executed, perform one or more methods, such as those described herein. The information carrier may be a computer-readable medium and/or a machine-readable medium, such as the memory 104, the storage device 106, and/or memory on processor 102.

The high-speed interface 108 manages bandwidth-intensive operations for the system 130, while the low-speed interface 112 (e.g., a low-speed controller) manages lower bandwidth-intensive operations. Such allocation of functions is exemplary. In some embodiments, the high-speed interface 108 is coupled to memory 104, the input/output (I/O) device 116 (e.g., through a graphics processor or accelerator), and high-speed expansion ports 111, which may accept various expansion cards. In some embodiments, the low-speed interface 112 may be coupled to the storage device 106 and the low-speed bus 114 (e.g., a low-speed expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device, such as a switch or router (e.g., through a network adapter). As shown in FIG. 1B, the system 130 may include one network interface 120 configured to communicate via a quantum network (e.g., a network configured to provide communication between devices and/or systems by transmitting and receiving qubits) and another network interface 122 configured to communicate via the communication network 110 (e.g., a network configured to provide communication between devices and/or systems by transmitting and receiving data packets).

The system 130 may be implemented in a number of different forms. For example, the system 130 may be implemented as a standard server, or multiple times in a group of such servers. In some embodiments, the system 130 may also be implemented as part of a rack server system or a personal computer such as a laptop computer. Additionally, or alternatively, components from system 130 may be combined with one or more other same or similar systems and an entire system 130 may be made up of multiple computing devices communicating with each other.

Figure 1C:
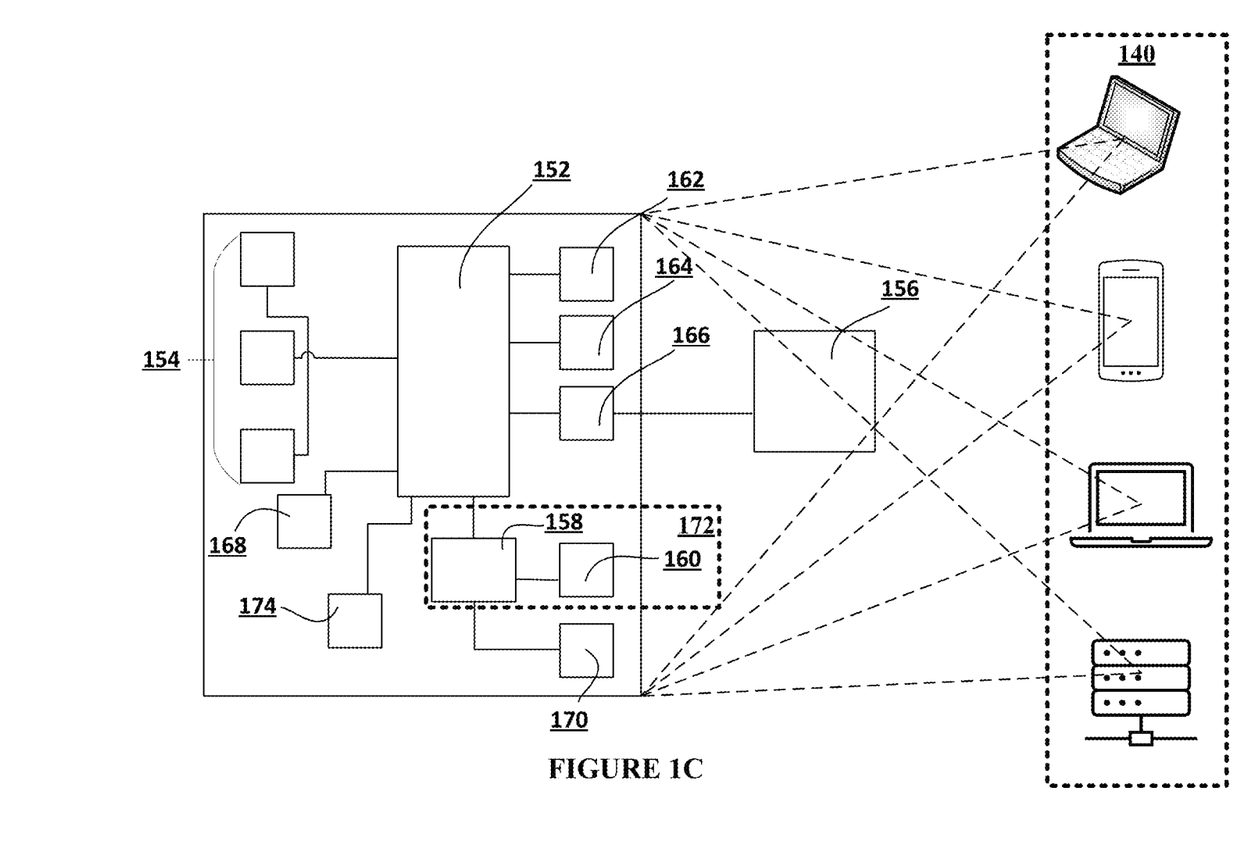

FIG. 1C illustrates an exemplary component-level structure of the end-point device(s) 140, in accordance with an embodiment of the disclosure. As shown in FIG. 1C, the end-point device(s) 140 includes a processor 152 (e.g., a processing device), memory 154, an input/output device 156 (e.g., a display), a communication interface 158, and a transceiver 160, among other components. The end-point device(s) 140 may also be provided with a storage device, such as a microdrive or other device, to provide additional storage. Each of the components 152, 154, 156, 158, and 160, may be interconnected using various buses, cables, and/or the like and several of the components may be mounted on a common motherboard or in other manners as appropriate.

The processor 152 may be configured to execute instructions within the end-point device(s) 140, including instructions stored in the memory 154, which in one embodiment may include the instructions of an application that may perform the functions disclosed herein, including certain logic, data processing, and data storing functions. For example, the processor 152 may execute computer program code stored on a non-transitory storage device (e.g., the memory 154), which may cause the processor 152 to perform one or more of the process flows described herein. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and/or wireless communication by end-point device(s) 140.

The processor 152 may be configured to communicate with the user through a control interface 164 and a display interface 166 coupled to the input/output device 156. The input/output device 156 may be, for example, a TFT LCD (Thin-Film-Transistor Liquid Crystal Display) or an OLED (Organic Light Emitting Diode) display, or other appropriate display technology. The display interface 166 may include appropriate circuitry and be configured for driving the input/output device 156 to present graphical and other information to a user. The control interface 164 may receive commands from a user and convert them for submission to the processor 152. In addition, an external interface 168 may be provided in communication with the processor 152, so as to enable near area communication of end-point device(s) 140 with other devices. External interface 168 may provide, for example, for wired communication and/or wireless communication, and the end-point device(s) 140 may include multiple external interfaces 168. In some embodiments, the control interface 164 and/or the display interface 166 may include a heads-up display worn on the user's head, one or more devices worn by the user (e.g., on the user's hands), one or more devices held by the user (e.g., a controller device), and/or the like for rendering visual content, receiving input from the user, providing haptic feedback to the user, and/or the like. For example, the end-point device(s) 140 may be and/or include a virtual reality headset, a virtual reality system (e.g., including a headset and one or more accessories), and/or the like.

The memory 154 stores information within the end-point device(s) 140. The memory 154 may be implemented as one or more of a computer-readable medium or media, a volatile memory unit or units, and/or a non-volatile memory unit or units. Expansion memory may also be provided and connected to end-point device(s) 140 through an expansion interface, which may include, for example, a SIMM (Single In Line Memory Module) card interface. Such expansion memory may provide extra storage space for end-point device(s) 140 and may also store applications and/or other information therein. In some embodiments, expansion memory may include instructions to carry out or supplement the processes described herein and may include secure information. For example, expansion memory may be provided as a security module for end-point device(s) 140 and may be programmed with instructions that permit secure use of end-point device(s) 140. Additionally, or alternatively, secure applications may be provided via SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product may include instructions that, when executed, perform one or more methods, such as those described herein. The information carrier may be a computer-readable medium and/or a machine-readable medium, such as the memory 154, expansion memory, memory on the processor 152, and/or a propagated signal that may be received, for example, over transceiver 160 and/or external interface 168.

In some embodiments, a user may use the end-point device(s) 140 to transmit and/or receive information and/or commands to and/or from the system 130 via the communication network 110. Communication between the system 130 and the end-point device(s) 140 may be subject to an authentication protocol allowing the system 130 to maintain security by permitting only authenticated users and/or processes to access protected resources of the system 130, which may include servers, databases, applications, and/or any of the components described herein. To this end, the system 130 may trigger an authentication subsystem that may require the user and/or the process to provide authentication credentials to determine whether the user and/or the process is eligible to access the protected resources. Once the authentication credentials are validated and the user and/or the process is authenticated, the authentication subsystem may provide the user and/or the process with permissioned access to the protected resources. Similarly, the end-point device(s) 140 may provide the system 130 and/or other client devices permissioned access to the protected resources of the end-point device(s) 140, which may include a GPS (Global Positioning System) device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes and/or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. The communication interface 158 may provide for communications under various telecommunications standards (e.g., 2G, 3G, 4G, 5G, and/or the like) using their respective layered protocol stacks. These communications may occur through a transceiver 160, such as a radio-frequency transceiver. Short-range communication may occur, such as using a Bluetooth, Wi-Fi, or other such transceiver. In some embodiments, the communication interface 158 and the transceiver 160 may form a network interface 172 configured to communicate via the communication network 110 (e.g., a network configured to provide communication between devices and/or systems by transmitting and receiving data packets). GPS receiver module 170 may provide additional navigation-related and/or location-related wireless data to end-point device(s) 140, which may be used as appropriate by applications running thereon, and in some embodiments, one or more applications operating on the system 130. The end-point device(s) 140 may also include another network interface 174 configured to communicate via a quantum network (e.g., a network configured to provide communication between devices and/or systems by transmitting and receiving qubits).

The end-point device(s) 140 may also communicate audibly using audio codec 162, which may receive spoken information from a user and convert the spoken information to usable digital information. Audio codec 162 may likewise generate audible sound for a user, such as through a speaker (e.g., in a handset) of end-point device(s) 140. Such sound may include sound from voice telephone calls, may include recorded sound (e.g., voice messages, music files, and/or the like), and/or may include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

As noted, a user may contact an entity in an effort to obtain resource management services from the entity on behalf of another entity associated with the user. The entity may manage one or more systems configured to request information from users to determine whether or not the users and/or their associated entities are eligible for the resource management services from the entity, establish resource accounts for the users and/or their associated entities, provide services to the users and/or their associated entities, and/or the like. However, the entity systems processing the user's responses to such requests consumes significant computing resources (e.g., processing resources, memory resources, power resources, communication resources, and/or the like) and/or network resources. Furthermore, if the user misunderstands the request, the user may provide incorrect and/or non-responsive information to the entity system, which the entity system then processes. The entity systems processing such incorrect and/or non-responsive information further consumes significant computing resources (e.g., processing resources, memory resources, power resources, communication resources, and/or the like) and/or network resources.

For example, issues may arise where users over an electronic network submitting communications (e.g., by video chat, text, phone calls, and/or the like) have difficulty understanding information they are being told through the electronic communication. Such issues may arise when a user is speaking to an associate employed by the entity via the electronic communication and noise interrupts the background of the communication. Such issues may also arise when the associate uses industry jargon, incorrect language, a different language as compared to the user's native language, and/or the like.

In view of the foregoing, the present invention is directed to methods and systems that use an artificial intelligence engine including a large language model (LLM) to analyze user data (e.g., historical user data, current user data, historical communications with the user, current communication data, and/or the like) to determine whether, during a current communication period, there is any misunderstanding on the part of the user. For example, the artificial intelligence engine may be trained to pick up hesitations that are not normally in the user's historical communications, and the LLM may determine that confusion is present and that the information being presented should be presented differently (e.g., in a different format such as visually instead of verbally, in a different language, in a different dialect, in different terms, and/or the like). In some embodiments, the LLM may be able to determine a geographic region of the user based on one or more communications by the user (e.g., their accent, dialect, and/or the like). The method and/or the system may determine the region the user is natively from and/or dynamically choose the proper language, dialect, terms, and/or the like to present information. Additionally, or alternatively, the method and/or the system may correlate different modalities of user communication (e.g., terms spoken, pauses taken, typing speed, facial expressions, and/or the like) to determine whether a misunderstanding has occurred.

In some embodiments, upon determining a misunderstanding has occurred, the method and/or the system may automatically transmit an electronic communication to a user device associated with a user that rectifies the misunderstanding (e.g., a user associated with the information of the misunderstanding). Additionally, or alternatively, the method and/or the system may further generate training data for a user, which may be dynamically updated based on each user's understanding, capabilities, native language, and/or the like, which the LLM would be able to identify and adjust outputs accordingly.

In this way, the method and/or the system may leverage an LLM on electronic communications to determine whether a misunderstanding has occurred by the user of the electronic communication and determine how to rectify the misunderstanding dynamically and automatically. Such data used by the invention may further include a correlation between the different modalities the uses to communicate (e.g., speech patterns, typing speed, facial expressions, and/or the like). Furthermore, the method and/or the system may include re-training the artificial intelligence engine and/or the LLM using labeled interaction data associated with the user to improve the performance of the artificial intelligence engine and/or the LLM. In this way, the method and/or the system may conserve the computing resources (e.g., processing resources, memory resources, power resources, communication resources, and/or the like) and/or network resources that would otherwise be consumed by entity systems processing the user's responses to requests. Additionally, or alternatively, the method and/or the system may conserve the computing resources (e.g., processing resources, memory resources, power resources, communication resources, and/or the like) and/or network resources that would otherwise be consumed by entity systems processing incorrect and/or non-responsive information.

Figure 2:
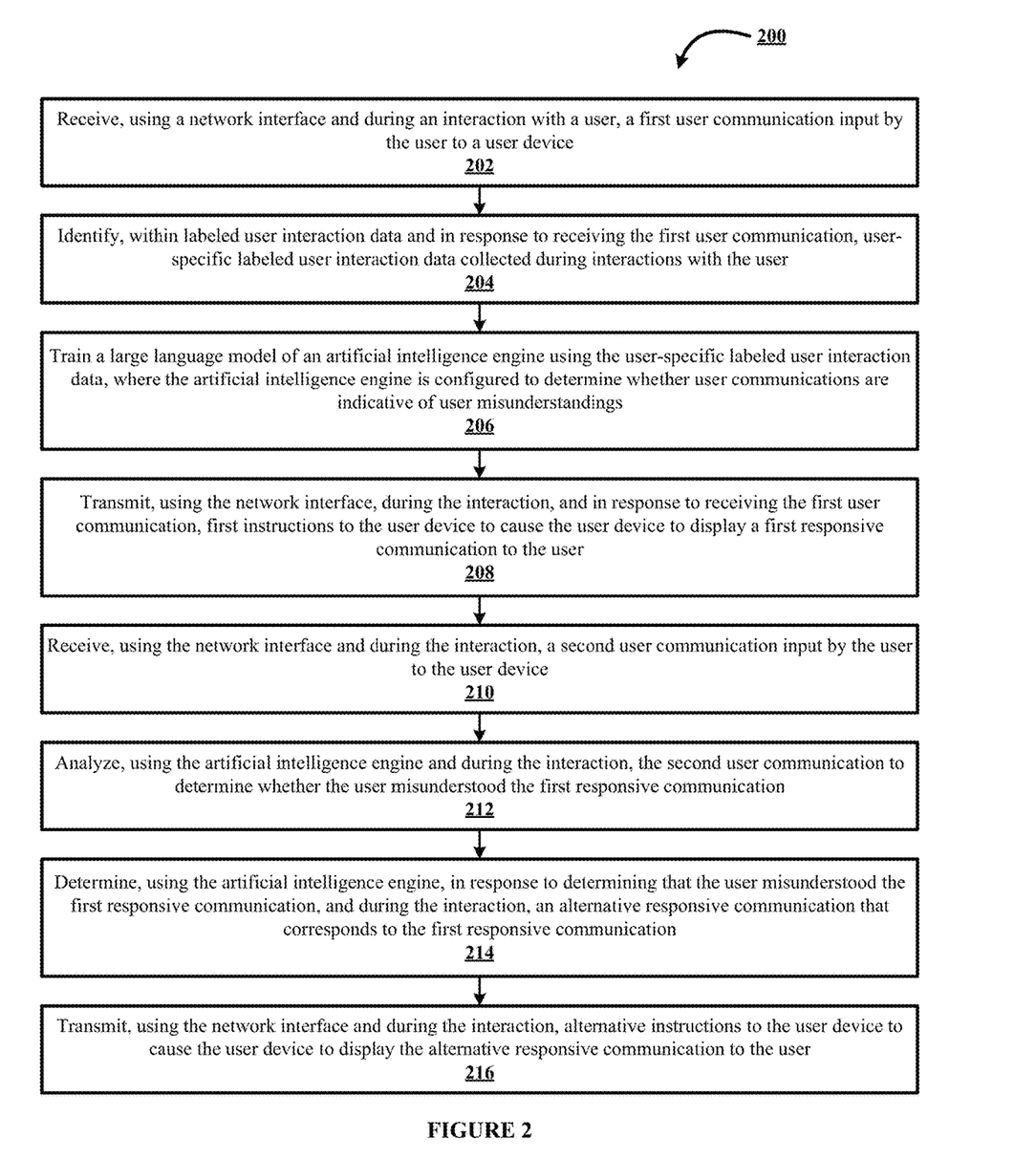
FIG. 2 illustrates a process flow for dynamically generating output data in response to input communications using artificial intelligence, in accordance with an embodiment of the disclosure.

FIG. 2 illustrates a process flow 200 for dynamically generating output data in response to input communications using artificial intelligence, in accordance with an embodiment of the disclosure. In some embodiments, one or more systems for dynamically generating output data in response to input communications using artificial intelligence (e.g., similar to the system 130 described herein with respect to FIGS. 1A-1C, similar to the end-point device(s) 140 described herein with respect to FIGS. 1A-1C, and/or the like) may perform the process flow 200.

As shown in block 202, the process flow 200 may include receiving, using a network interface and during an interaction with a user, a first user communication input by the user to a user device. For example, a system (e.g., similar to the system 130 described herein with respect to FIGS. 1A-1C, similar to the end-point device(s) 140 described herein with respect to FIGS. 1A-1C, and/or the like) associated with an entity (e.g., a financial institution) may receive a communication from a user associated with another entity (e.g., a merchant, a service provider, a business, and/or the like) requesting resource management services from the entity on behalf of the other entity. In some embodiments, the process flow 200 may include receiving the first user communication as input to a graphical user interface (e.g., on a website maintained by the entity and/or the like). In such embodiments, the process flow 200 may include displaying the graphical user interface, causing the user device to display the graphical user interface, and/or the like. Additionally, or alternatively, the first user communication may be a voice-based communication, and the process flow 200 may include receiving the voice-based communication via a microphone, via telephone, via a network, via voicemail, and/or the like. In some embodiments, the first user communication may be a video (e.g., live video), and the process flow 200 may include receiving the video via a video platform, a livestreaming platform, a network, and/or the like.

As shown in block 204, the process flow 200 may include identifying, within labeled user interaction data and in response to receiving the first user communication, user-specific labeled user interaction data collected during interactions with the user. In some embodiments, the labeled user interaction data may be based on user interaction data collected during a plurality of interactions between users and an entity. For example, a system (e.g., similar to the system 130 described herein with respect to FIGS. 1A-1C, similar to the end-point device(s) 140 described herein with respect to FIGS. 1A-1C, and/or the like) associated with an entity (e.g., a financial institution) may generate, collect, and/or store interaction data (e.g., communications, transaction data, information entered in one or more data fields, terms spoken, pauses taken, typing speeds, facial expressions, and/or the like) from interactions between users associated with other entities (e.g., merchants, service providers, businesses, and/or the like).

In some embodiments, the process flow 200 may include receiving, using the network interface, the user interaction data collected during the plurality of interactions between the users and the entity. Additionally, or alternatively, the process flow 200 may include labelling, for each interaction of the plurality of interactions, the user interaction data of the respective interaction as either (i) an interaction in which one or more users misunderstood a communication or (ii) an interaction in which all users understood all communications to obtain the labeled user interaction data. For example, the process flow 200 may include parsing, using an artificial intelligence engine, the user interaction data to determine whether one or more users misunderstood a communication during each interaction and then labeling the user interaction associated with the interaction accordingly. In some embodiments, the process flow 200 may include training the large language model using the labeled user interaction data.

As shown in block 206, the process flow 200 may include training a large language model of an artificial intelligence engine using the user-specific labeled user interaction data, where the artificial intelligence engine is configured to determine whether user communications are indicative of user misunderstandings. For example, the process flow 200 may include performing one or more of the activities described herein with respect to FIG. 3 to train the large language model.

As shown in block 208, the process flow 200 may include transmitting, using the network interface, during the interaction, and in response to receiving the first user communication, first instructions to the user device to cause the user device to display a first responsive communication to the user. In some embodiments, the process flow 200 may include providing the first responsive communication in a graphical user interface (e.g., on a website maintained by the entity and/or the like). In such embodiments, the process flow 200 may include displaying the graphical user interface, causing the user device to display the graphical user interface, and/or the like. Additionally, or alternatively, the first responsive communication may be a voice-based communication, and the process flow 200 may include generating, transmitting, providing, and/or the like the voice-based communication via a speaker, via telephone, via a network, via voicemail, and/or the like. In some embodiments, the first responsive communication may be a video (e.g., live video), and the process flow 200 may include generating, transmitting, providing, and/or the like the video via a video platform, a livestreaming platform, a network, and/or the like.

In some embodiments, the process flow 200 may include, before transmitting the first responsive communication, determining, using the artificial intelligence engine and based on the first user communication, the first responsive communication. For example, the process flow 200 may include generating, creating, identifying, and/or the like (e.g., using the artificial intelligence engine) a first responsive communication associated with a higher likelihood of being understood by the user (e.g., based on historical interaction data associated with the user, based on historical interaction data associated with similar users, based on historical interaction data associated with all users, and/or the like). In some embodiments, the process flow 200 may include generating, creating, identifying, and/or the like (e.g., using the artificial intelligence engine) a first responsive communication in a format (e.g., text, audio, video, image, and/or the like), a language, a phrasing, and/or the like associated with a higher likelihood of being understood by the user.

As shown in block 210, the process flow 200 may include receiving, using the network interface and during the interaction, a second user communication input by the user to the user device. In some embodiments, the process flow 200 may include receiving the second user communication as input to a graphical user interface (e.g., on a website maintained by the entity and/or the like). In such embodiments, the process flow 200 may include displaying the graphical user interface, causing the user device to display the graphical user interface, and/or the like. Additionally, or alternatively, the second user communication may be a voice-based communication, and the process flow 200 may include receiving the voice-based communication via a microphone, via telephone, via a network, via voicemail, and/or the like. In some embodiments, the second user communication may be a video (e.g., live video), and the process flow 200 may include receiving the video via a video platform, a livestreaming platform, a network, and/or the like.

As shown in block 212, the process flow 200 may include analyzing, using the artificial intelligence engine and during the interaction, the second user communication to determine whether the user misunderstood the first responsive communication. For example, the process flow 200 may include analyzing terms spoken, pauses taken, typing speeds, facial expressions, and/or the like during the interaction using the artificial intelligence engine and/or the large language model to determine whether the user misunderstood the first responsive communication. In some embodiments, the process flow 200 may include, when analyzing the second user communication to determine whether the user misunderstood the first responsive communication, analyzing the user's inputting of the second user communication into the user device to identify pauses taken, typing speed, facial expressions and/or the like of the user.

As shown in block 214, the process flow 200 may include determining, using the artificial intelligence engine, in response to determining that the user misunderstood the first responsive communication, and during the interaction, an alternative responsive communication that corresponds to the first responsive communication. In some embodiments, the process flow 200 may include generating, creating, identifying, and/or the like (e.g., using the artificial intelligence engine) an alternative responsive communication that communicates the same and/or similar information as the first responsive communication in a different manner, such as a different format (e.g., text, audio, video, image, and/or the like), a different language, a different phrasing and/or the like. For example, the first responsive communication may include a language-based communication (e.g., text, voice, and/or the like), and the alternative responsive communication may include a video displayed by the user device to the user. As another example, the first responsive communication may include a language-based communication (e.g., text, voice, and/or the like), and the alternative responsive communication may include an image displayed by the user device to the user. As another example, the first responsive communication may be in a first language, and the alternative responsive communication may be in a second language that is different from the first language. Additionally, or alternatively, the process flow 200 generating, creating, identifying, and/or the like (e.g., using the artificial intelligence engine) an alternative responsive communication associated with a higher likelihood of being understood by the user (e.g., based on historical interaction data associated with the user, based on historical interaction data associated with similar users, based on historical interaction data associated with all users, and/or the like). In some embodiments, the process flow 200 may include determining, in response to receiving the first user communication, a geographic region associated with the user and, when determining the alternative responsive communication, determining the alternative responsive communication based on the geographic region associated with the user.

As shown in block 216, the process flow 200 may include transmitting, using the network interface and during the interaction, alternative instructions to the user device to cause the user device to display the alternative responsive communication to the user. In some embodiments, the process flow 200 may include providing the alternative responsive communication in a graphical user interface (e.g., on a website maintained by the entity and/or the like).

In such embodiments, the process flow 200 may include displaying the graphical user interface, causing the user device to display the graphical user interface, and/or the like. Additionally, or alternatively, the alternative responsive communication may be a voice-based communication, and the process flow 200 may include generating, transmitting, providing, and/or the like the voice-based communication via a speaker, via telephone, via a network, via voicemail, and/or the like. In some embodiments, the alternative responsive communication may be a video (e.g., live video), and the process flow 200 may include generating, transmitting, providing, and/or the like the video via a video platform, a livestreaming platform, a network, and/or the like.

As will be appreciated by one of ordinary skill in the art in view of the present disclosure, the process flow 200 may include additional steps, alternative steps, and/or the like. The process flow 200 may include additional embodiments, such as any single embodiment or any combination of embodiments described herein. Although FIG. 2 shows example blocks of the process flow 200, in some embodiments, the process flow 200 may include additional blocks, fewer blocks, different blocks, or differently arranged blocks than those depicted in FIG. 2. Additionally, or alternatively, two or more of the blocks of the process flow 200 may be performed in parallel.

Figure 3:
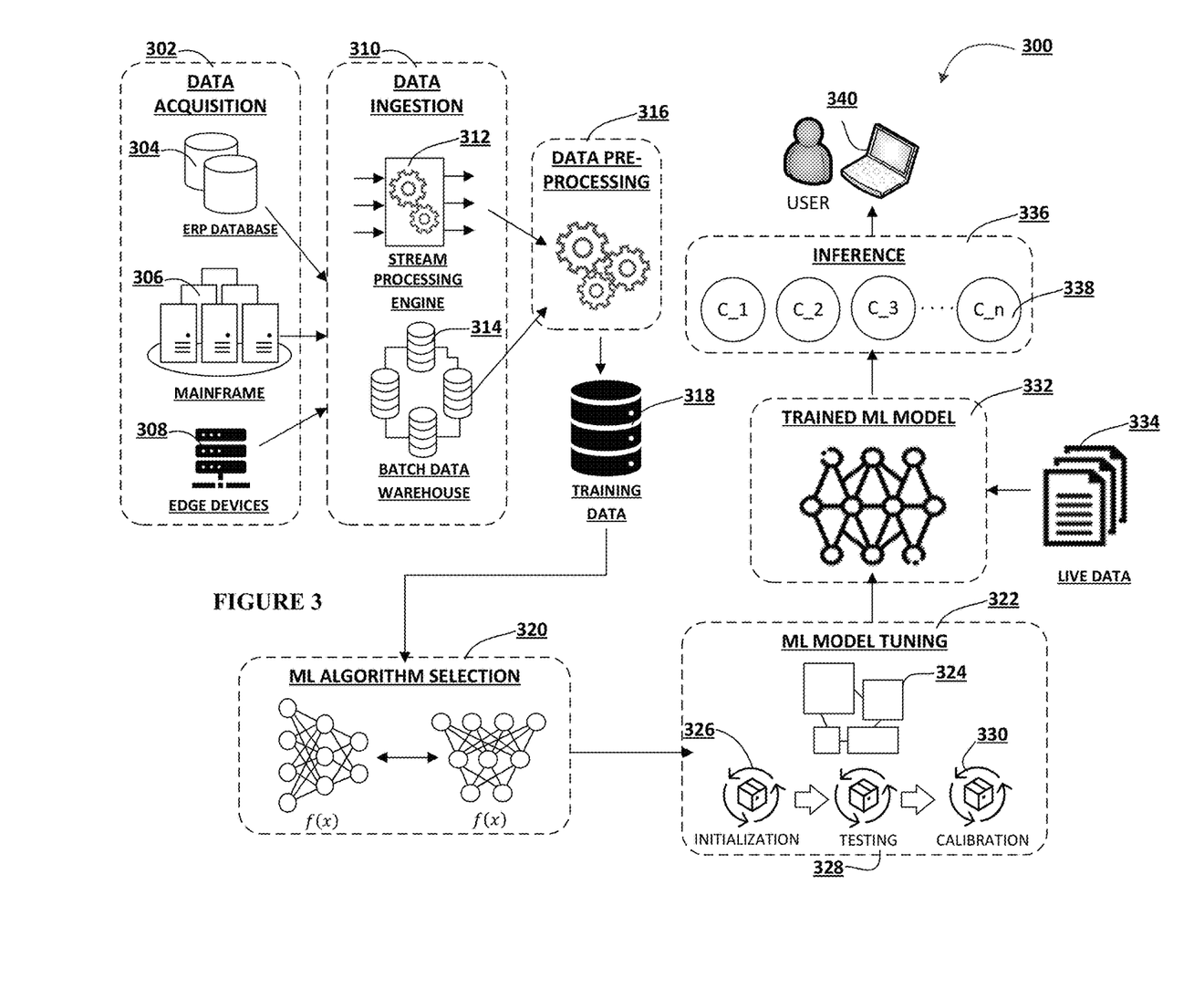
FIG. 3 illustrates an exemplary architecture of a machine learning (ML) subsystem, in accordance with an embodiment of the disclosure.

FIG. 3 illustrates an exemplary architecture of a machine learning (ML) subsystem 300, in accordance with an embodiment of the invention. The machine learning subsystem 300 may include a data acquisition engine 302, a data ingestion engine 310, a data pre-processing engine 316, a ML model tuning engine 322, and an inference engine 336. In some embodiments, one or more systems for hosting a distributed network for providing entity services may include and/or use the machine learning subsystem 300 to perform one or more of the steps of one or more of the process flows described herein. For example, the artificial intelligence engine and/or the large language model described herein with respect to FIG. 2 may include and/or use the machine learning subsystem 300 to perform one or more of the steps of process flow 200.

The data acquisition engine 302 may identify various internal and/or external data sources to generate, test, and/or integrate new features for training a machine learning model 324. These internal and/or external data sources 304, 306, and 308 may be initial locations where the data originates or where physical information is first digitized. The data acquisition engine 302 may identify the location of the data and describe connection characteristics for access and retrieval of data. In some embodiments, data is transported from each data source 304, 306, or 308 using any applicable network protocols, such as the File Transfer Protocol (FTP), HyperText Transfer Protocol (HTTP), or any of the myriad Application Programming Interfaces (APIs) provided by websites, networked applications, and other services. In some embodiments, the data sources 304, 306, and 308 may include data regarding interactions between users and an entity (e.g., communications, transaction data, information entered in one or more data fields, terms spoken, pauses taken, typing speeds, facial expressions, and/or the like), data regarding the users, data regarding entities associated with the users, data regarding the entity, and/or Enterprise Resource Planning (ERP) databases that host data related to day-to-day business activities such as accounting, procurement, project management, exposure management, supply chain operations, and/or the like, a mainframe that is often an entity's central data processing center, edge devices that may be any piece of hardware, such as sensors, actuators, gadgets, appliances, and/or machines, that are programmed for certain applications and can transmit data over the internet or other networks, and/or the like. The data acquired by the data acquisition engine 302 from these data sources 304, 306, and 308 may then be transported to the data ingestion engine 310 for further processing. In some embodiments, the data sources 304, 306, and 308 may include historical data associated with historical interactions between users and an entity (e.g., communications, transaction data, information entered in one or more data fields, terms spoken, pauses taken, typing speeds, facial expressions, and/or the like), data regarding the users, data regarding entities associated with the users, data regarding the entity, and/or Enterprise Resource Planning (ERP) databases that host data related to day-to-day business activities such as accounting, procurement, project management, exposure management, supply chain operations, and/or the like.

Depending on the nature of the data imported from the data acquisition engine 302, the data ingestion engine 310 may move the data to a destination for storage or further analysis. Typically, the data imported from the data acquisition engine 302 may be in varying formats as they come from different sources, including RDBMS, other types of databases, S3 buckets, CSVs, or from streams. Since the data comes from different places, it needs to be cleansed and transformed so that it can be analyzed together with data from other sources. At the data acquisition engine 302, the data may be ingested in real-time, using a stream processing engine 312, in batches using the batch data warehouse 314, or a combination of both. The stream processing engine 312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 314 collects and transfers data in batches according to scheduled intervals, trigger events, or any other logical ordering.

In machine learning, the quality of data and the useful information that can be derived therefrom directly affects the ability of the machine learning model 324 to learn. The data pre-processing engine 316 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 318 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 322 may be used to train a machine learning model 324 using the training data 318 to make predictions or decisions without explicitly being programmed to do so. The machine learning model 324 represents what was learned by the selected machine learning algorithm 320 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 322 may repeatedly execute cycles of initialization 326, testing 328, and calibration 330 to optimize the performance of the machine learning algorithm 320 and refine the results in preparation for deployment of those results for consumption or decision making. To this end, the ML model tuning engine 322 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 318. A fully trained machine learning model 332 is one whose hyperparameters are tuned and model accuracy maximized.

The trained machine learning model 332, similar to any other software application output, can be persisted to storage, file, memory, or application, or looped back into the processing component to be reprocessed. More often, the trained machine learning model 332 is deployed into an existing production environment to make practical business decisions based on live data 334. To this end, the machine learning subsystem 300 uses the inference engine 336 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 338) or observations based on defined classifications, represent possible solutions to a decision based on certain conditions, model complex relationships between inputs and outputs to find patterns in data or capture a statistical structure among variables with unknown relationships, and/ or the like. On the other hand, machine learning models trained using unsupervised learning algorithms may be used to group (e.g., C_1, C_2 . . . . C_n 338) live data 334 based on how similar they are to one another to solve exploratory challenges where little is known about the data, provide a description or label (e.g., C_1, C_2 . . . . C_n 338) to live data 334, such as in classification, and/or the like. These categorized outputs, groups (clusters), or labels are then presented to a user input system 340, which may be similar to the end-point device(s) 140 shown and described herein with respect to FIGS. 1A-IC. In still other cases, machine learning models that perform regression techniques may use live data 334 to predict or forecast continuous outcomes.

As noted, in some embodiments, one or more systems for dynamically generating output data in response to input communications using artificial intelligence described herein with respect to FIGS. 1A-1C and 2 may include and/or use the machine learning subsystem 300 to perform one or more of the steps of the process flows described herein. For example, the artificial intelligence engine and/or the large language model described herein with respect to FIG. 2 may include and/or use one or more machine learning models similar to trained machine learning model 332 and/or one or more inference engines similar to the inference engine 336.

It will be understood that the embodiment of the machine learning subsystem 300 illustrated in FIG. 3 is exemplary and that other embodiments may vary. As another example, in some embodiments, the machine learning subsystem 300 may include more, fewer, or different components.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (e.g., a non-transitory computer readable medium including firmware, resident software, micro-code, computer program code, and/or the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for dynamically generating output data in response to input communications using artificial intelligence, the system comprising:
   a network interface configured to communicate via a communication network;
   an artificial intelligence engine comprising a large language model, wherein the artificial intelligence engine is configured to determine whether user communications are indicative of user misunderstandings;
   a non-transitory storage device comprising computer program code stored thereon; and
   a processing device operably coupled to the network interface, and the non-transitory storage device, wherein the computer program code comprises computer instructions configured to cause the processing device to:
   receive, using the network interface and during an interaction with a user, a first user communication input by the user to a user device;
   identify, within labeled user interaction data and in response to receiving the first user communication, user-specific labeled user interaction data collected during interactions with the user, wherein the labeled user interaction data is based on user interaction data collected during a plurality of interactions between users and an entity;
   train the large language model using the user-specific labeled user interaction data;
   transmit, using the network interface, during the interaction, and in response to receiving the first user communication, first instructions to the user device to cause the user device to display a first responsive communication to the user;

receive, using the network interface and during the interaction, a second user communication input by the user to the user device;

analyze, using the artificial intelligence engine and during the interaction, the second user communication to determine whether the user misunderstood the first responsive communication, analyze the user's inputting of the second user communication into the user device to identify pauses taken, typing speed, and facial expressions of the user;

determine, using the artificial intelligence engine, in response to determining that the user misunderstood the first responsive communication, and during the interaction, an alternative responsive communication that corresponds to the first responsive communication; and transmit, using the network interface and during the interaction, alternative instructions to the user device to cause the user device to display the alternative responsive communication to the user.

2. The system of claim 1, wherein the computer program code comprises computer instructions configured to cause the processing device to, before transmitting the first responsive communication, determine, using the artificial intelligence engine and based on the first user communication, the first responsive communication.

3. The system of claim 1, wherein the computer program code comprises computer instructions configured to cause the processing device to:

receive, using the network interface, the user interaction data collected during the plurality of interactions between the users and the entity;

label, for each interaction of the plurality of interactions, the user interaction data of the respective interaction as either (i) an interaction in which one or more users misunderstood a communication or (ii) an interaction in which all users understood all communications to obtain the labeled user interaction data; and train the large language model using the labeled user interaction data.

4. The system of claim 1, wherein the computer program code comprises computer instructions configured to cause the processing device to:

determine, in response to receiving the first user communication, a geographic region associated with the user; and when determining the alternative responsive communication, determine the alternative responsive communication based on the geographic region associated with the user.

5. The system of claim 1, wherein the first responsive communication is a language-based communication, and wherein the alternative responsive communication comprises a video displayed by the user device to the user.

6. The system of claim 1, wherein the first responsive communication is a language-based communication, and wherein the alternative responsive communication comprises an image displayed by the user device to the user.

7. The system of claim 1, wherein the first responsive communication is a text-based communication, and wherein transmitting the alternative instructions to the user device causes the user device to audibly communicate the alternative responsive communication.

8. The system of claim 1, wherein the first responsive communication is in a first language, and wherein the alternative responsive communication is in a second language that is different from the first language.

9. A computer program product for dynamically generating output data in response to input communications using artificial intelligence, the computer program product comprising a non-transitory computer-readable medium comprising code causing an apparatus to:

receive, using a network interface and during an interaction with a user, a first user communication input by the user to a user device;

identify, within labeled user interaction data and in response to receiving the first user communication, user-specific labeled user interaction data collected during interactions with the user, wherein the labeled user interaction data is based on user interaction data collected during a plurality of interactions between users and an entity;

train a large language model of an artificial intelligence engine using the user-specific labeled user interaction data, wherein the artificial intelligence engine is configured to determine whether user communications are indicative of user misunderstandings;

transmit, using the network interface, during the interaction, and in response to receiving the first user communication, first instructions to the user device to cause the user device to display a first responsive communication to the user;

receive, using the network interface and during the interaction, a second user communication input by the user to the user device;

analyze, using the artificial intelligence engine and during the interaction, the second user communication to determine whether the user misunderstood the first responsive communication, analyze the user's inputting of the second user communication into the user device to identify pauses taken, typing speed, and facial expressions of the user;

determine, using the artificial intelligence engine, in response to determining that the user misunderstood the first responsive communication, and during the interaction, an alternative responsive communication that corresponds to the first responsive communication; and transmit, using the network interface and during the interaction, alternative instructions to the user device to cause the user device to display the alternative responsive communication to the user.

10. The computer program product of claim 9, wherein the non-transitory computer-readable medium comprises code causing the apparatus to, before transmitting the first responsive communication, determine, using the artificial intelligence engine and based on the first user communication, the first responsive communication.

11. The computer program product of claim 9, wherein the non-transitory computer-readable medium comprises code causing the apparatus to:

receive, using the network interface, the user interaction data collected during the plurality of interactions between the users and the entity;

label, for each interaction of the plurality of interactions, the user interaction data of the respective interaction as either (i) an interaction in which one or more users misunderstood a communication or (ii) an interaction in which all users understood all communications to obtain the labeled user interaction data; and train the large language model using the labeled user interaction data.

12. The computer program product of claim 9, wherein the non-transitory computer-readable medium comprises code causing the apparatus to:
- determine, in response to receiving the first user communication, a geographic region associated with the user; and
- when determining the alternative responsive communication, determine the alternative responsive communication based on the geographic region associated with the user.

13. The computer program product of claim 9, wherein the first responsive communication is a language-based communication, and wherein the alternative responsive communication comprises a video displayed by the user device to the user.

14. The computer program product of claim 9, wherein the first responsive communication is a language-based communication, and wherein the alternative responsive communication comprises an image displayed by the user device to the user.

15. The computer program product of claim 9, wherein the first responsive communication is a text-based communication, and wherein transmitting the alternative instructions to the user device causes the user device to audibly communicate the alternative responsive communication.

16. The computer program product of claim 9, wherein the first responsive communication is in a first language, and wherein the alternative responsive communication is in a second language that is different from the first language.

17. A method for dynamically generating output data in response to input communications using artificial intelligence, the method comprising:
- receiving, using a network interface and during an interaction with a user, a first user communication input by the user to a user device;
- identifying, within labeled user interaction data and in response to receiving the first user communication, user-specific labeled user interaction data collected during interactions with the user, wherein the labeled user interaction data is based on user interaction data collected during a plurality of interactions between users and an entity;
- training a large language model of an artificial intelligence engine using the user-specific labeled user interaction data, wherein the artificial intelligence engine is configured to determine whether user communications are indicative of user misunderstandings;
- transmitting, using the network interface, during the interaction, and in response to receiving the first user communication, first instructions to the user device to cause the user device to display a first responsive communication to the user;
- receiving, using the network interface and during the interaction, a second user communication input by the user to the user device;
- analyzing, using the artificial intelligence engine and during the interaction, the second user communication to determine whether the user misunderstood the first responsive communication, analyze the user's inputting of the second user communication into the user device to identify pauses taken, typing speed, and facial expressions of the user;
- determining, using the artificial intelligence engine, in response to determining that the user misunderstood the first responsive communication, and during the interaction, an alternative responsive communication that corresponds to the first responsive communication; and
- transmitting, using the network interface and during the interaction, alternative instructions to the user device to cause the user device to display the alternative responsive communication to the user.

18. The method of claim 17, comprising, before transmitting the first responsive communication, determining, using the artificial intelligence engine and based on the first user communication, the first responsive communication.

* * * * *